United States Patent
von der Heide

[15] 3,683,062
[45] Aug. 8, 1972

[54] ROTATIONAL CASTING METHOD

[72] Inventor: Elmer J. von der Heide, Hudson, Ohio

[73] Assignee: Essex International, Inc., Fort Wayne, Ind.

[22] Filed: Aug. 20, 1970

[21] Appl. No.: 65,638

Related U.S. Application Data

[62] Division of Ser. No. 720,700, April 11, 1968, Pat. No. 3,550,206.

[52] U.S. Cl. ............................264/310, 264/85
[51] Int. Cl. ......................................B29c 5/04
[58] Field of Search ...............264/85, 310–322; 18/26 RR, DIG. 62

[56] References Cited

UNITED STATES PATENTS

| | | | |
|---|---|---|---|
| 3,514,508 | 5/1970 | Schott et al. | 264/310 X |
| 3,112,529 | 12/1963 | Chupa | 18/26 RR |
| 2,818,604 | 1/1958 | Miller | 18/DIG. 62 |
| 3,329,751 | 7/1967 | Slicker | 264/85 |

*Primary Examiner*—Robert F. White
*Assistant Examiner*—Richard R. Kucia
*Attorney*—McNenny, Farrington, Pearne and Gordon

[57] ABSTRACT

A method for rotationally molding or casting thermoplastic or thermosetting resinous compositions. The machine includes a rotatable turret on which at least one mold-rotating spindle and a pair of motor drives therefor are mounted as a removable unit with the spindle projecting radially outwardly from the turret. The spindle includes means for removably mounting a pair of perpendicular axes at the same or different speeds as determined by the speeds of the motor drives, which are independently variable. The turret has provision for mounting additional spindle and motor drive units thereon with equi-angular spacing of the spindles about the turret to satisfy varying output and/or process requirements. The machine further includes treating stations through which the molds on the spindle or spindles are successively indexed. The number, type, and location of the treating stations may be varied to suit a number of different molding processes. Inert gas may be fed into each mold cavity, and maintained therein at a predetermined positive pressure during any predetermined portion of the mold processing cycle after loading and closing the molds and until they are to be opened for removal of the molded or cast article. Separate ovens with independent temperature controls may be provided at successive stations. Cooling at a cooling station is two stage, first with a wet steam spray and second with a liquid coolant spray.

11 Claims, 14 Drawing Figures

INVENTOR.
ELMER J. von der HEIDE

INVENTOR.
ELMER J. von der HEIDE
ATTORNEYS

PATENTED AUG 8 1972 3,683,062

INVENTOR
ELMER J. von der HEIDE

BY

ATTORNEYS

ROTATIONAL CASTING METHOD

This application is a division of application Ser. No. 720,700, filed Apr. 11, 1968 now U.S. Pat. No. 3,550,206.

BACKGROUND OF THE INVENTION

Various methods have been proposed for forming hollow articles by rotationally casting or molding liquid or particulate (solid) thermoplastic and thermosetting resins, such as vinyl plastisols, particulate polyethylene, polypropylene, and the like, and numerous other classes of resins. Hereinafter, the term "molding" will be used generically to include "casting." The machines developed for such molding operations employ molds comprising cooperating hollow mold sections which, when closed, define the external surface of one or more articles to be molded. A measured amount of resinous molding material in liquid or fusible solid form is placed within each mold cavity, and the mold is closed and rotated about a plurality of axes to cause the molding material to be distributed over and coat the interior of the mold cavity. While being rotated for that purpose, the mold is subjected to heat to convert the molding material to a settable fluid condition. In either case, the mold is then cooled and opened for removal of the finished article.

Prior art molding machines have usually been designed to perform a particular molding process or technique, depending upon the particular plastic material and size of the articles to be molded. For example, if the material to be molded is a vinyl plastisol, a suitable molding machine would be provided with a conveyor mechanism (such as an indexing table or a loop conveyor) which successively conveys the mold from a mold loading station to an oven which heats the vinyl plastisol to a temperature sufficient to gel the plastisol while the mold is rotating and then to a cooling station where the molds are cooled by spraying water thereon to solidify the resin, sometimes while continuing the mold rotation. If the plastic is a particulate thermoplastic, the sequence of stops is the same, but the oven heats the molds to a temperature sufficient to liquefy the solid plastic.

Such molding operations have been performed heretofore with turret-type machines having mold carrying spindles radially extending from an indexing table. The mold carrying spindles are indexed through treating stations, such as ovens, cooling chambers, and loading and unloading stations. However, such machines have generally been provided by the manufacturers with the required number of spindles, molds, and processing stations for operation according to a predetermined process and time cycle with little flexibility. Thus, when a plastic molder had fluctuating or radically differing production requirements, he often found it uneconomical to operate a large volume rotational casting machine during periods of low production or to apply a low volume machine to a high volume molding operation, or he often was unable to adjust a machine to vary the processing conditions as required by different molding jobs. Since most prior art rotational molding machines cannot readily be modified to accommodate such varying production requirements, the plastic molder faced obvious problems in equipping his plant and using his equipment efficiently and economically.

SUMMARY OF THE INVENTION

The processes of the present invention enable a plastic molder to modify the machine and/or the method or process performed by the machine to suit drastically different plastic molding operations and widely varying production requirements with a high degree of process control.

According to this invention, a molding machine includes a rotating turret having one or more mold carrying spindles and motor drives therefor with each spindle and its motor drives being mounted as a separate unit on an indexing table. Each spindle has an outer, hollow, rotatable shaft or sleeve which both supports and rotates a mold or group of molds about a first axis and a second shaft within the outer sleeve which drives the mold or molds about a second axis angularly related to the first axis without being required to perform a mold supporting function. Separate motor drives are provided for each spindle for independently driving the outer sleeve and inner shaft thereof throughout the molding and cooling operations. The outer sleeve of each spindle is mounted within and supported by bearings which are removably attached to the indexing table, so that the drive means for the outer sleeve and inner shaft of the spindle are wholly independent of the spindle supporting bearings and perform no spindle supporting function.

A molding machine according to this invention may be easily modified by relatively unskilled plant personnel to perform different molding operations by adding, removing, and/or rearranging the positions of mold carrying spindles, ovens, and/or cooling chambers. A plastic molder may, therefore, initially acquire a machine having, for example, only one mold carrying spindle, one oven, and one cooling chamber for pilot operations, and thereafter add on to his machine as production requirements increase. Moreover, he may rearrange mold carrying spindles, ovens, and/or cooling chambers to perform different plastic molding operations with the same molding machine and/or obtain the desired production rate with optimum efficiency and quality control.

Thus, the present invention provides a versatile and inexpensive molding machine which will accommodate a wide variety of production techniques and volume requirements for plastic molding operations.

The invention further contemplates a molding method which controls degradation of the resin being molded at elevated temperature and also controls shrinkage and distortion of the molded articles during cooling. To this end, the apparatus includes means for feeding inert gases into molds to scavenge air from the molds, which might tend to oxidize and degrade the resin at elevated temperatures, and to maintain a predetermined inert gas pressure inside the articles being molded until they have been cooled for removal from the molds. The latter function not only serves to control shrinkage and distortion but, also, prevents excessive pressure build-up in the molds during the heating cycle while avoiding the use of conventional mold vents and the problem of preventing a cooling liquid from entering the molds through such vents during the cooling operation. In accordance with this aspect of the invention, there is provided a gas passageway from inside a mold to and along a spindle axis to a point adjacent a spindle support location. One end of the passageway opens inside the mold and inside the article being molded therein and the opposite end of the passageway opens adjacent the spindle support.

With or without employing an inert gas supply and pressure relief system for controlling mold pressures and minimizing shrinkage and distortion, the shrinkage and distortion can also be reduced by controlling the cooling of the molds. It has been customary in the past to cool the molds by spraying them with water or other liquid coolant, sometimes after a preliminary quench by blasting the molds with air at room temperature. Such techniques usually cause differential shrinkage and product distortion, since a part only of the mold that is inevitably first contacted by the water spray cools faster than the remaining part of the mold. According to this invention, the molds may be initially cooled by wet steam, uniformly and rapidly, to a point only slightly below the setting temperature of the plastic. Although the wet steam is hotter than the water heretofore sprayed on the molds, the steam movement and scrubbing effect of the wet steam on the mold surface, together with the greater ease of contacting the entire outer surface of the mold substantially simultaneously with the cooling medium, combine to give a more rapid initial cooling with greater uniformity so as to avoid differential shrinkage. The preliminary steam quench may then be followed by a water spray cooling step to reduce the temperature of the molds to a convenient handling temperature and an air blast to dry the molds. The apparatus of the invention permits the use of any other desired sequence of air, steam, and water cooling steps.

DETAILED DESCRIPTION OF THE DRAWINGS

Figure 1:
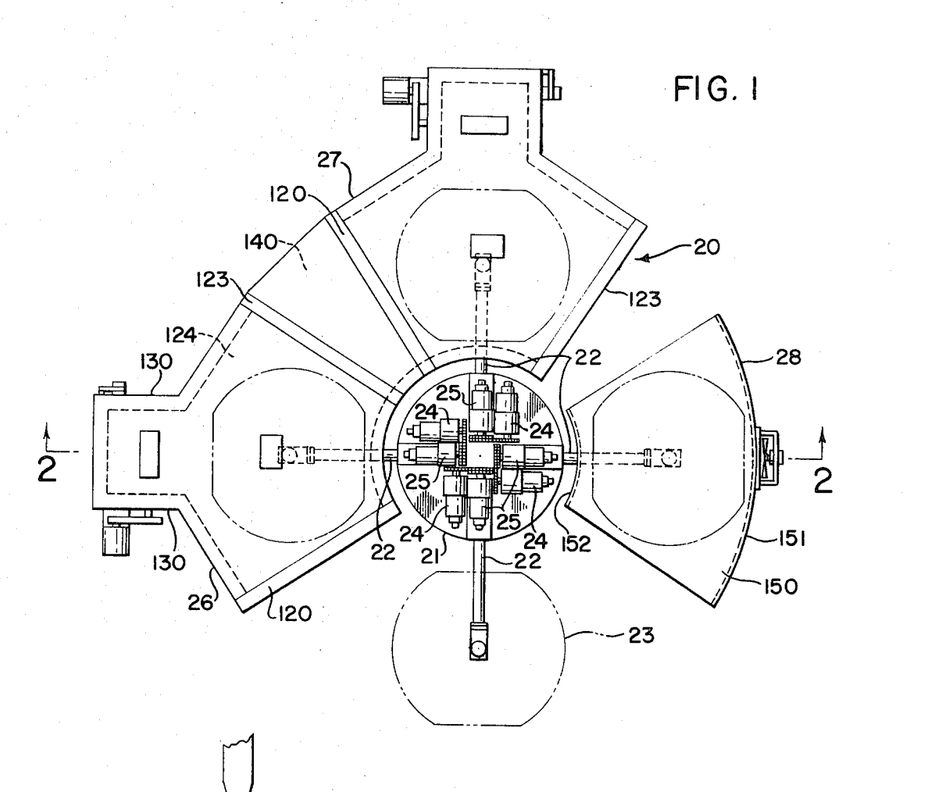
FIG. 1 is a partly schematic plan view of a rotational molding machine in accordance with this invention.
Figure 2:
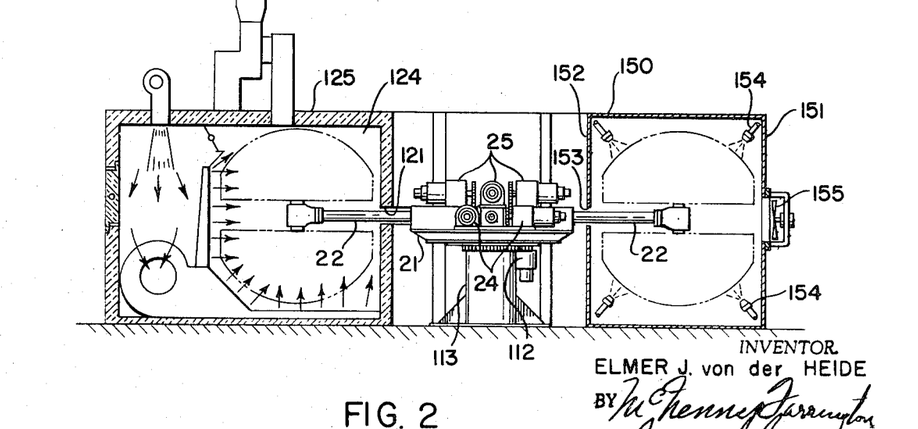
FIG. 2 is a cross-sectional view of the machine of FIG. 1, the plane of the section being indicated by the line 2—2 in FIG. 1.

Referring now to FIGS. 1 and 2, a rotational casting machine 20 according to one aspect of the present invention includes an intermittently driven turntable 21 upon which four radially projecting, mold carrying spindles 22 are removably mounted. Each spindle 22 carries a mold or group of molds at the outer end thereof. In the drawings, the mold or mold group is generally indicated by phantom outline 23, which outline also delineates the envelope traced by the mold or group of molds during their rotation about two axes. Such biaxial rotation, as will be explained in greater detail, is provided by independent drive means for each axis of each spindle 22. For this purpose, each spindle 22 is provided with first and second drive motors 24 and 25.

The machine illustrated in FIGS. 1 and 2 is provided with four treating or process stations for performing a two-stage heating operation and a single-stage cooling operation. To this end, there is provided a first oven 26, a second oven 27, and a cooling chamber 28 at successive stations, the fourth station being employed to empty and reload the molds. As further explained below, the two ovens 26 and 27 may be connected by a shroud to converse heat and avoid chilling the molds while being indexed from the first oven to the second oven.

The character and arrangement of the four stations illustrated in FIGS. 1 and 2 are suitable, for example, for the rotational molding of vinyl plastisols. When using such a molding composition, the sequence of operations would involve loading the molds at a first station (the lowermost station illustrated in FIG. 1), heating the rotating molds at a second station in the oven 26 to gel the material being molded, continued heating of the molds at a third station in the oven 27 to complete the molding of the resin (with or without further raising its temperature) while continuing to rotate the molds, cooling the molds at a fourth station in the cooling chamber 28 to solidify and cool the molded articles while still continuing the mold rotation, and then unloading and reloading the molds at the first station.

The machine shown in FIGS. 1 and 2 may also be employed to mold any of a variety of liquid, thermosetting resin compositions. For example, various phenolic or melamine resins, dispersions of acrylonitrile-butadiene-styrene resins, and the like may be cured during the molding operation to a final, thermoset condition. Similarly, meltable solid or liquid resin mixtures, or mixtures of resins and cross-linking agents, may be heated during the molding operation to effect a cross-linking of the resin molecules and produce thermoset, molded, plastic end products. In such cases, the heating of the rotating molds successively in the ovens 26 and 27 at the second and third stations may be regulated as required by the particular resin or resin mixtures charged to the molds at the first station. The molded and solidified articles would then be cooled by cooling the molds in the cooling chamber 28 at the fourth station and would be unloaded from the molds at the unloading and reloading station. Obviously, if desired, a single oven 26 at the second station could be followed by two cooling chambers or by a single elongated cooling chamber a the third and fourth stations.

Figure 12:
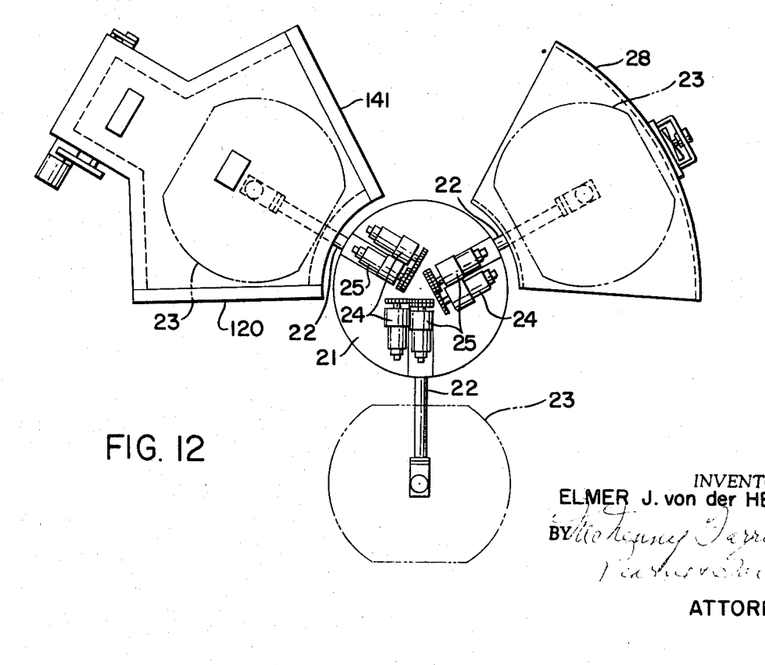
FIG. 12 is a partly schematic plan view of a rotational casting machine having three mold carrying spindles and treating stations according to a further aspect of this invention.
Figure 13:
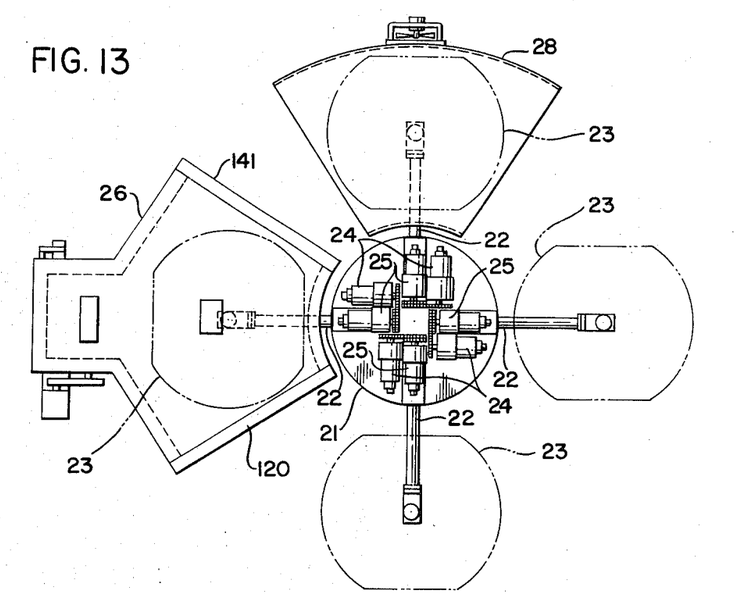
FIG. 13 is a partly schematic plan view of another rotational casting machine having four mold carrying spindles and treating stations according to a still further aspect of this invention.

Most of the above processes may also be carried out in the single oven machines of FIGS. 12 and 13, the only procedural change required in some cases being that of repeatedly raising and lowering the oven temperature for holding a particular molding composition at a plurality of curing temperatures for predetermined time periods.

As may be seen in FIG. 13, the same four-spindle molding machine may readily be modified to employ a single oven 26 at one station, a cooling chamber 28 at the next station, and separate unloading and loading operations at the other two stations. This is advantageous in molding operations that involve mold loading and unloading stops that are slow and cannot both be performed at a single station within the predetermined time period allocated for each dwell of the mold assemblies at the successive stations. This may occur, for example, when each mold involves a number of cavities, each containing complex arrangements of inserts.

Alternatively, as may be seen in FIG. 12, a three-spindle molding machine may be assembled on the same indexing table 21 and employ the single oven 26 and the cooling chamber 28 by placing the single oven and cooling chamber 120° As AS still further alternatives, only two spindles or only one spindle may be used on the indexing table with the station arrangement of FIG. 1, FIG. 12, or FIG. 13.

A plastic molder may begin pilot plant operations using a single mold carrying spindle 22 and associated drive motors 24 and 25 and mounting them on an indexing table 21 for movement through the stations of any of FIGS. 1, 12, or 13. This may be done with a modest investment in equipment. As the table 21 is indexed, the mold assembly on the single spindle 22 will successively move from station to station according to the particular cycle determined for molding a particular article while using the particular station arrangement selected.

To increase production as business may require, the plastic molder may first acquire only one or more additional spindles 22 and add them to the original table 21 while using the same station arrangement as before or a modified station arrangement. If he started with the three-station arrangement of FIG. 12, for example and requires four spindles 22 to meet production requirements, he may simply rearrange the oven 26 and cooling chamber 28 as shown in FIG. 13. Alternatively, by also adding a second oven unit 27, he may convert his machine to one having the dual oven arrangement of FIG. 1. Obviously, by reversing such evolution of the machine, the high capacity machine of FIG. 1 may be turned into an efficient low capacity machine.

It should be appreciated from the foregoing that this invention permits a plastic molder to modify his machine according to production requirements, both as regards production volume and processing operations, to perform a wide variety of different plastic molding operations with the basic machine elements of this invention.

Figure 6:
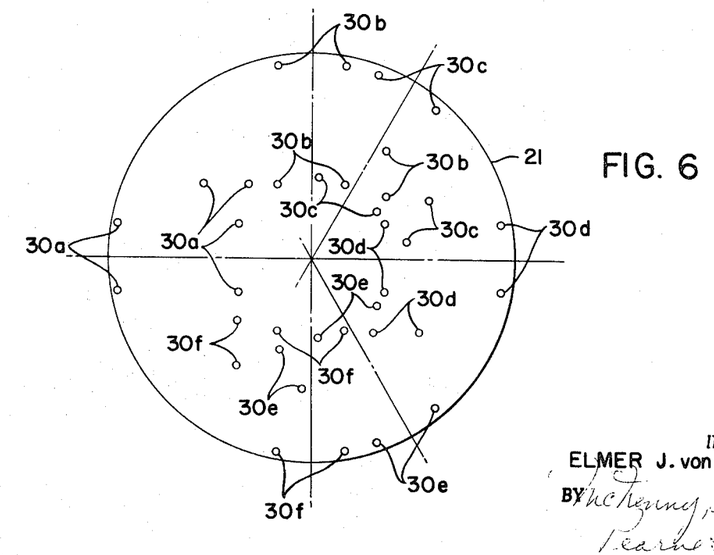
FIG. 6 is a plan view of an indexing table upon which different numbers of mold carrying spindles may be mounted in accordance with this invention.
Figures 7, 7A:
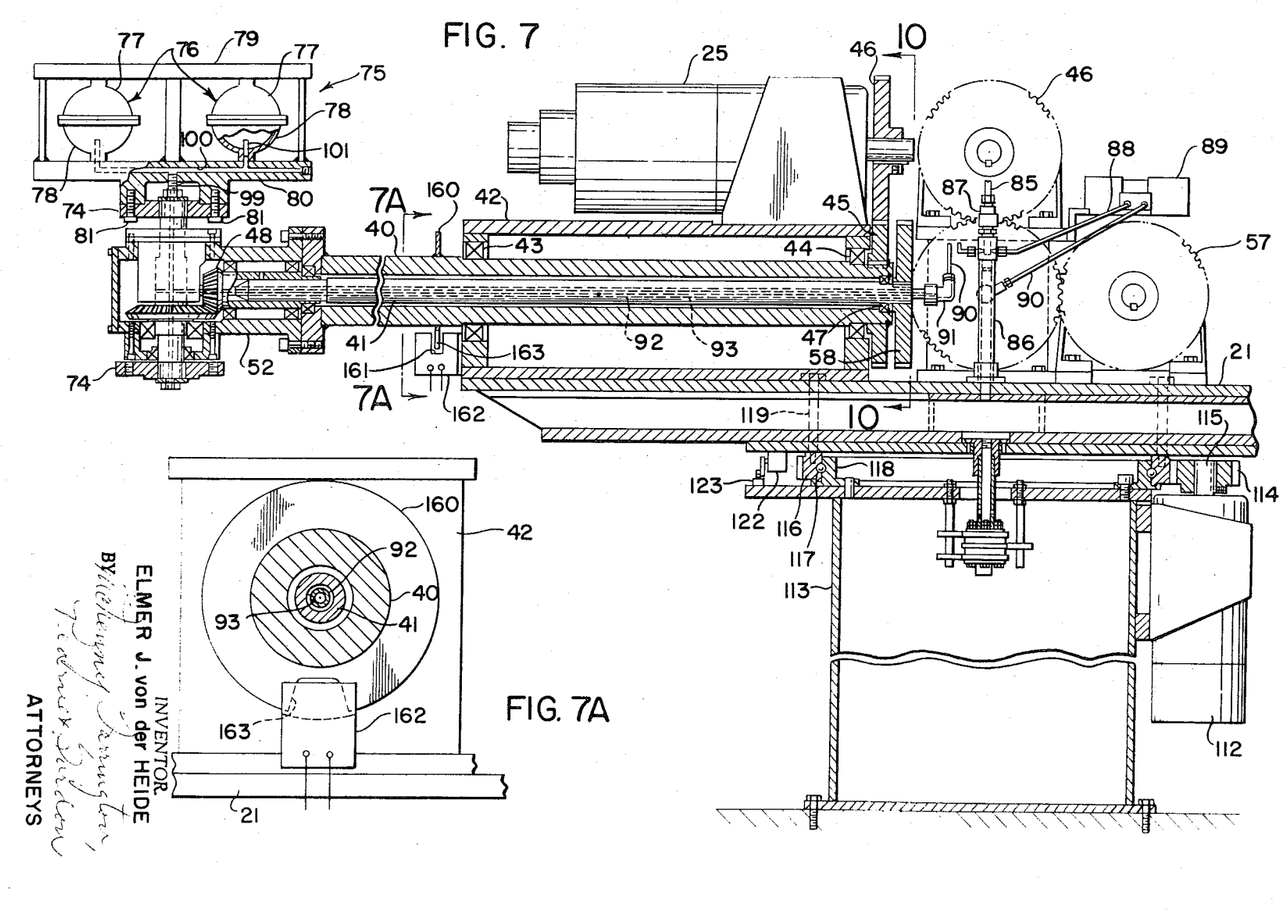
FIG. 7 in an enlarged, fragmentary, cross-sectional view of the same machine, the plane of the section being indicated by the line 7—7 in FIG. 5.
FIG. 7A is a fragmentary transverse section of the machine taken as indicated by the line 7A—7A in FIG. 7 and showing a control switch assembly for the power circuit to a spindle driving motor.
Figure 8:
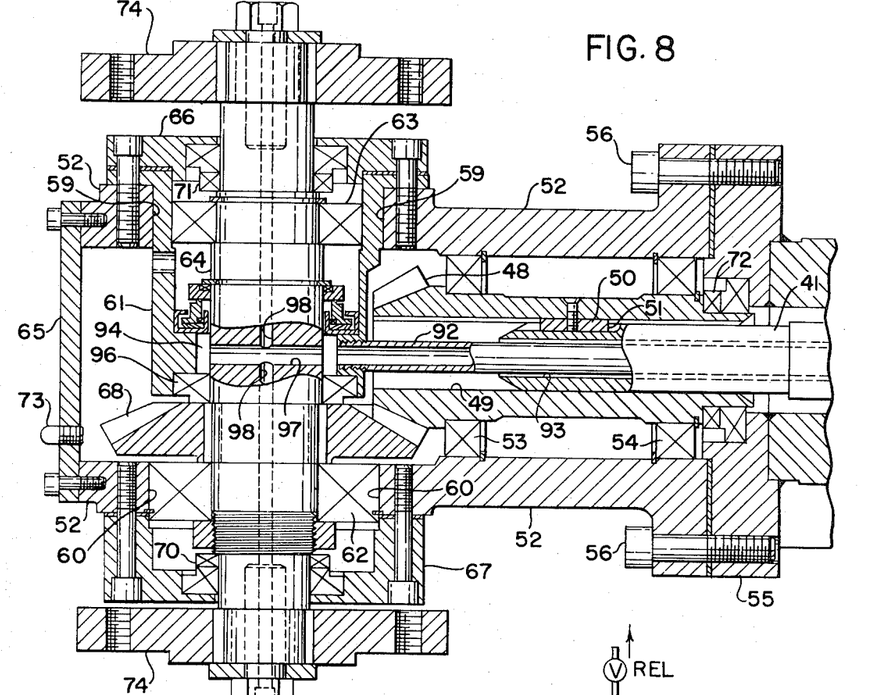
FIG. 8 is an enlarged cross-sectional view of the mold carrying end of the spindle illustrated in FIG. 7, showing that portion in greater detail.

To facilitate the kinds of conversions just described, the turntable 21 may be provided with a plurality of sets of mounting holes 30a, 30b, 30c, 30d, 30e, and 30f, arranged as shown in FIG. 6 so the turntable 21 may carry from one to four spindles 22. One set of holes 30a, 30b, 30c, 30d, 30e, or 30f may be employed to mount a single spindle; any two opposite sets of holes 30a and 30d or 30b and 30f may be employed to mount two spindles; the three sets of holes 30a, 30c, and 30e may be employed to mount three spindles; and the four sets of holes 30a, 30b, 30d, 30f may be employed to mount four spindles.

Referring now to the details of the spindle and mold assemblies and drives therefor as shown in FIGS. 5 and 7–11, the spindle 22 is a unit which includes a hollow outer sleeve 40 and an inner shaft 41. The outer sleeve 40 extends through a supporting bearing box or spindle housing 42 and has a substantial portion of its length contained within the box and supported by bearings 43 and 44 at each end thereof. One end of the sleeve 40 extends radially inwardly beyond the bearing 44 and is provided with a spur gear 45 which is keyed to the sleeve 40. The spur gear 45 is driven by a spur gear 46 which is keyed to the output shaft of the drive motor 25. The drive motor 25 is mounted on top of the box 42 to conserve space.

The inner shaft 41 is mounted within the hollow sleeve 40 for independent axial rotation relative thereto by a bearing 47 at the radially inward end thereof. The radially outward end of the shaft 41 is keyed to the hub of a bevel gear 48. As may be seen most clearly in FIG. 8, the bevel gear 48 and its hub have a bore 49 which receives the radially outer end of the shaft 41 and is provided with a key 50 which cooperates with a slot 51 in the shaft 41. The bevel gear 48 is rotatably mounted within a gear box or housing 52 by bearings 53 and 54. The housing 52 is removably secured to a flanged end portion 55 of the outer sleeve 40 by bolts 56. The housing 52 is thereby rotated with the outer sleeve 40, and the bevel gear 48 is driven by the inner shaft 41 relative to the outer sleeve 40 and the housing 52.

The inner shaft 41 and its bevel gear 48 are driven by the motor 24 through a spur gear 57 connected to the drive shaft of the motor 24 and a cooperating spur gear 58 which is keyed to a projecting end of the shaft 41.

The housing 52 is provided with axially aligned, transverse bores 59 and 60, which are respectively provided with an inner housing member 61 and a bearing 62. Another bearing 63 is mounted within the inner housing member 61. A cross shaft 64 is rotatably mounted with respect to the housing 52 by the bearings 62 and 63 and projects in both directions beyond the bores 59 and 60 for the attachment of mold assemblies as described below. The housing 52 is closed at its outer end by a plate 65, at one side by a cap 66, and at its diametrically opposite side by a cap 67. As shown (FIG. 8) the shaft 64 projects in opposite directions through the caps 66 and 67 and is journaled therein.

A bevel gear 68 is keyed to the shaft 64 within the housing 52 and is driven by the bevel gear 48 so that the shaft 64 is driven about its axis relative to the housing 52 by the drive motor 24.

The bearings 62, 63, 53, and 54 and the bevel gears 48 and 68 are enclosed and sealed in a chamber defined by the housing 52 and housing member 61, by oil seals 70 and 71 on the shaft 64, and by an oil seal 72 between the bevel gear 48 and the flange 55. That chamber forms a lubricant reservoir so that those bearings and bevel gears are immersed in lubricant, which may be admitted through a plug 73 in the end plate 65.

Each end of the transverse shaft 64 is provided with a mold mounting plate 74. A suitable mold or mold assembly 75 (FIG. 7) is mounted on each of the plates 74 (only one such assembly being shown). The mold assembly 75 may include a plurality of subassemblies 76 defining separate mold cavities, each cavity being formed by two separable mold sections 77 and 78. Each mold section 77 is mounted on a frame 79, and each mold section 78 is mounted on a frame 80. The frame 79 and its mold sections 77 may be removed from the frame 80 and its mold sections 78 by uncoupling suitable quick-disconnect clamps (not shown). The frame 80 is attached to its mold mounting plate 74 by a plurality of bolts 81.

Figure 9:
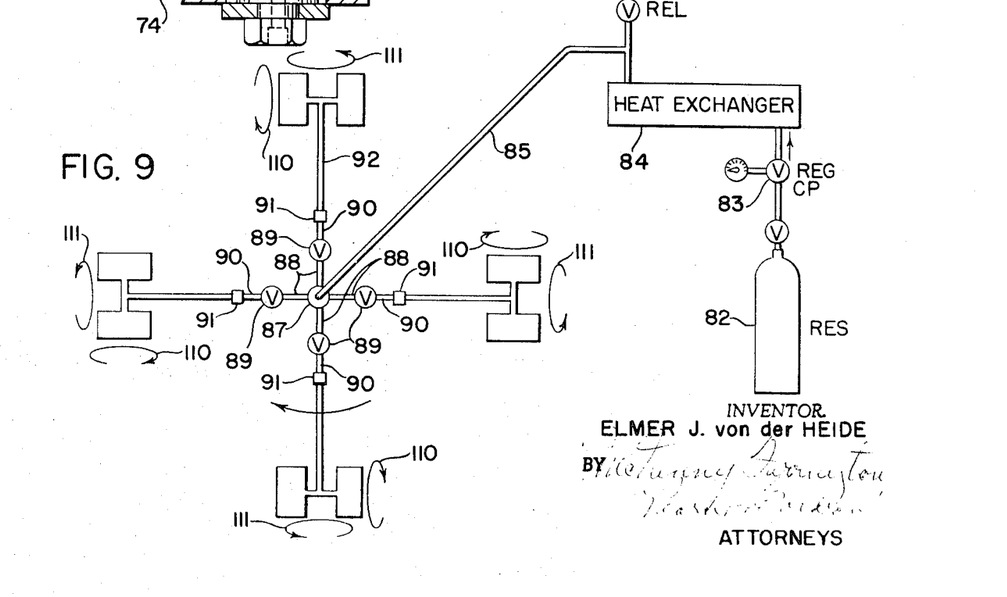
FIG. 9 is a schematic plan view of a fluid supply system for the mold cavities.
Figure 10:
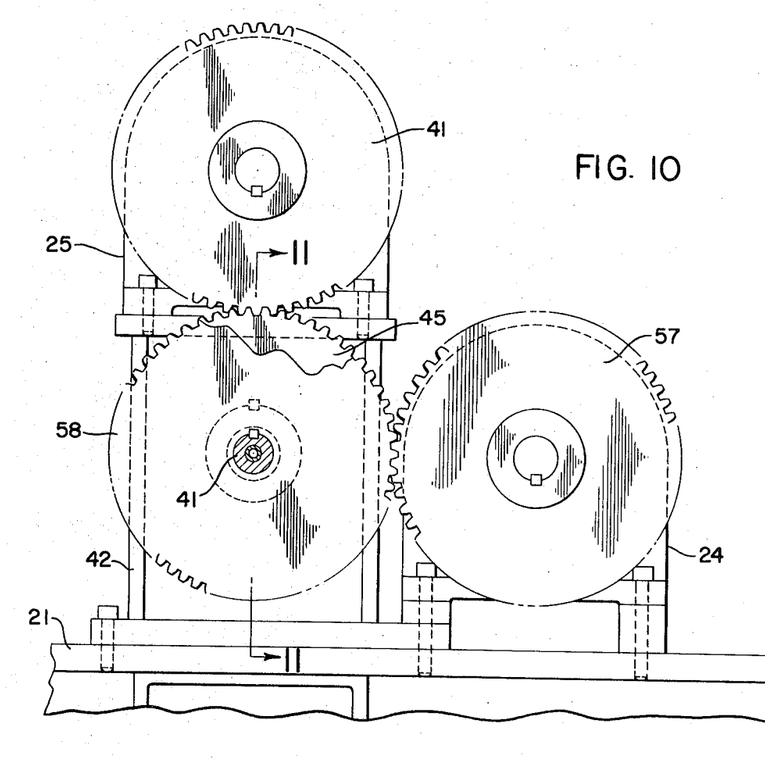
FIG. 10 is an enlarged fragmentary, elevational view of the same machine, the view being taken as indicated by the line 10—10 in FIG. 7.
Figure 11:
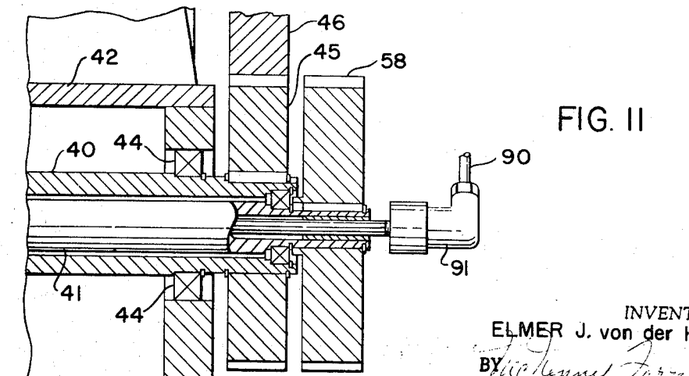
FIG. 11 is a fragmentary cross-sectional view of the same machine, the plane of the section being indicated by the line 11—11 in FIG. 10.

Each spindle 22 and its mold assembly 75 is provided with means for feeding inert gas into each mold cavity to purge air therefrom which might tend to oxidize and degrade the resin being cast. To this end, there is provided a source of pressurized inert gas, such as the reservoir 82 (FIG. 9). The reservoir 82 delivers its inert gas through a constant pressure regulating valve 83, a heat exchanger 84, and a supply line 85 to a distributor manifold 86 (FIG. 7) which is connected to the supply line 85 by a rotatable coupling 87. The manifold 86 is fixed to the table 21 and has a plurality of branch conduits 88 which are respectively connected to a corresponding plurality of on-off valves 89. The valves 89 are successively turned on by a cam operated switch 122 which engages a cam 123 (FIG. 7) as the spindle 22 is indexed from the mold loading position. One of the valves 89 is provided for each spindle 22, and each valve 89 has an outlet conduit 90 connected to its spindle 22 by a rotatable coupling 91.

Each rotatable coupling 91 is in fluid communication with the radially inner end of a delivery tube 92 which extends through an axial bore 93 in the shaft 41. The tube 92 is suitably journaled in the bore 93 for independent rotation relative to the shaft 41. The outer end of the tube 92 is threadedly engaged with and, therefore, driven by the housing member 61 that rotates with the outer sleeve 40. The tube 92 communicates with a chamber 94 within the housing member 61 that surrounds the transverse shaft 64 therein, opposite ends of the chamber 94 being closed by seals 95 and 96 acting between the shaft 64 and the member housing member 61. The chamber 94 is, in turn, in fluid communication with a transverse bore 97 and an axial bore 98 in the shaft 64.

The axial bore 98 is coupled at 99 (FIG. 7) to a passageway 100 in the frame 80, and the passageway 100, in turn, communicates with the cavity of each mold subassembly 76 through a tube 101 that projects well into the mold cavity to near the center thereof so that its open end will not be covered or plugged with resin during the molding operation.

After a measured amount of resin material to be molded is deposited in each mold cavity at the mold loading station and those molds are closed, the valve 89 on the associated spindle 22 is opened upon indexing of the table 21 and actuation of the switch 122 thereon to admit pressurized inert gas to the closed mold. The inert gas pressure causes leakage of the molds at their parting planes and scavenges air from the molds which would otherwise tend to oxidize and degrade certain molding resins when heated. When liquefied resin has coated the interior of the molds as a result of their rotation in the oven 26, the resin seals the molds against further leakage at their parting planes, and the inert gas pressure established by the regulating valve 83 is maintained inside the articles being molded during the balance of the molding and mold cooling operations.

The gas supply to the molds on a given spindle is cut off as the molds are moved from the cooling chamber toward the unloading station by further indexing of the table 21. This may be done by means of another appropriately located cam (not shown), like the cam 123, for again actuating the switch 122. For this purpose, the switch 122 may be a step switch or the like for alternately closing, opening, and closing a circuit on successive operations.

By setting the valve 83 to establish and maintain a predetermined positive gas pressure in the molds, shrinkage and distortion of the molded articles during the cooling step (when a partial vacuum inside the hollow articles would otherwise be created) can be materially reduced and more nearly perfect products can be made with greater consistency and less scrap loss. Generally, that predetermined gas pressure should be from around 2 psi gauge up to as high as 10 psi or so as limited primarily by the strength of the mold assembly.

If it is not desirable or necessary to admit gas to the molds, the gas supply and regulating system of FIG. 9 from the reservoir 82 to the rotatable joints 91 on each spindle tube 92 may simply be omitted or disconnected from the spindle tubes. Thus, the several mold cavities are still vented to the atmosphere at the center of the turret so that moisture from the cooling chamber 28 will never be drawn into the mold cavities during the cooling operation.

After the molds are loaded and closed at the loading station, the motors 24 and 25 on the associated spindle 22 are energized to rotate the mold assemblies 75 about two axes. Rotation about one such axis is caused by the motor 24 which drives the inner shaft 41 about its axis. Such rotation of the shaft 41 drives the bevel gears 48 and 68 and, therefore, the shaft 64 about its axis. Rotation of the shaft 64 about its axis causes the mold assembly 75 to be rotated about the axis of the shaft 64 in the direction of the arrow 110 (FIG. 9).

As the mold assembly 75 is rotated about the axis of the shaft 64 in the direction of the arrow 110 by the motor 24, the motor 25 rotates the outer sleeve 40 about its axis. Rotation of the sleeve 40 about its axis causes the shaft 64 to be rotated about the axis of the sleeve 40. The mold assembly 75 is thereby also rotated about the axis of the sleeve 40 in the direction of the arrow 111 (FIG. 9).

The relative speeds of the motors 24 and 25 may be independently varied to suit a particular molding operation. These relative speeds are preselected and are primarily dependent upon the shape of the article to be molded. This mold rotation, like the flow of inert gas (when used), is started and stopped automatically by suitable cam and switch controls (not shown) actuated by indexing of the table 21. Such rotation is continued during all of the treating operations performed on the molds and during the indexing operations between treating stations so that once the motors 24 and 25 are energized, they are not de-energized until the mold assembly 75 returns to the mold unloading station.

The loaded and rotating mold assemblies 75 are indexed to the oven 26 (FIGS. 1, 2, 12, and 13) by driving the table 21 in a clockwise direction. The drive means for the table 21 comprises a drive motor 112 (FIGS. 2 and 7) which is mounted on a pedestal base 113. A pinion gear 114 on a power input shaft 115 of the drive motor 112 drives a ring gear 116 in a clockwise direction with respect to the base 113. The inner surface of the ring gear 116 comprises a bearing race which cooperates with ball bearings 117 and a stationary bearing race 118 which is fixed to the pedestal base 113. The table 21 is connected to the ring gear 117 by bolts 119 so that the table is driven in a clockwise direction by the ring gear 116. The motor 112 is started and stopped according to any preselected time cycle of operation by any conventional timer control (not shown).

Figure 3:
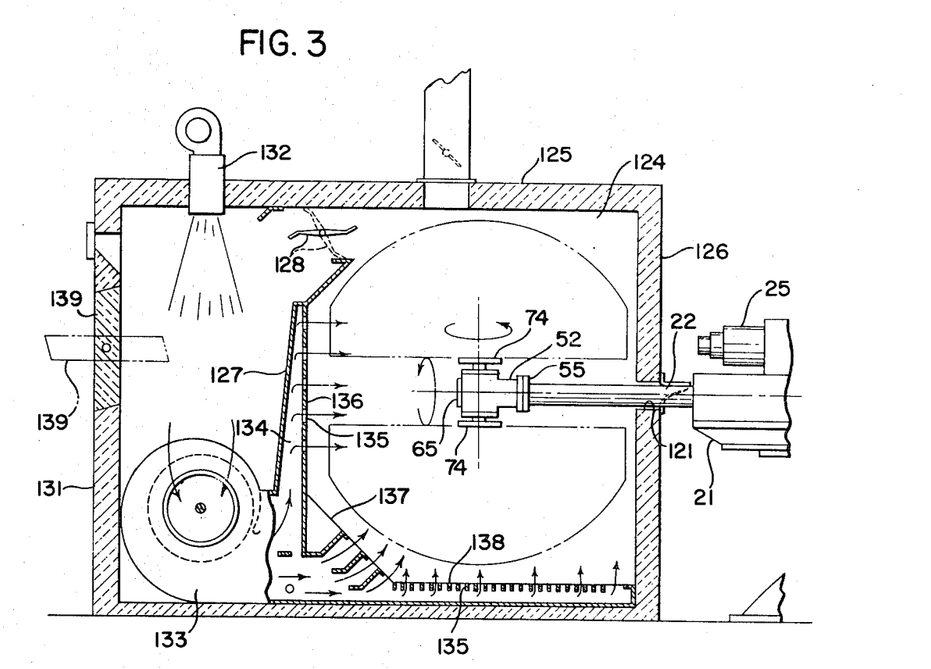
FIG. 3 is an enlarged, fragmentary, cross-sectional view similar to FIG. 1, showing in somewhat more detail a heating oven employed in the machine and the flow of heating fluid relative to molds within the oven.
Figure 4:
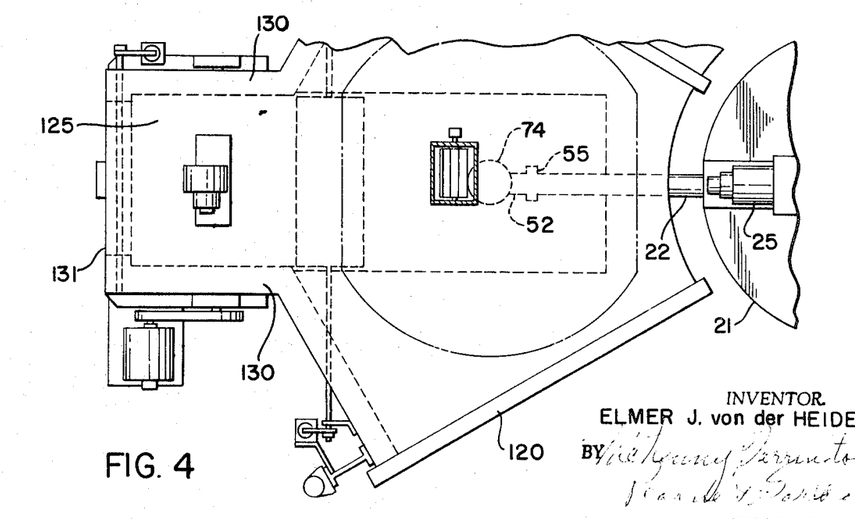
FIG. 4 is a fragmentary plan view of the oven shown in FIG. 3.
Figure 5:
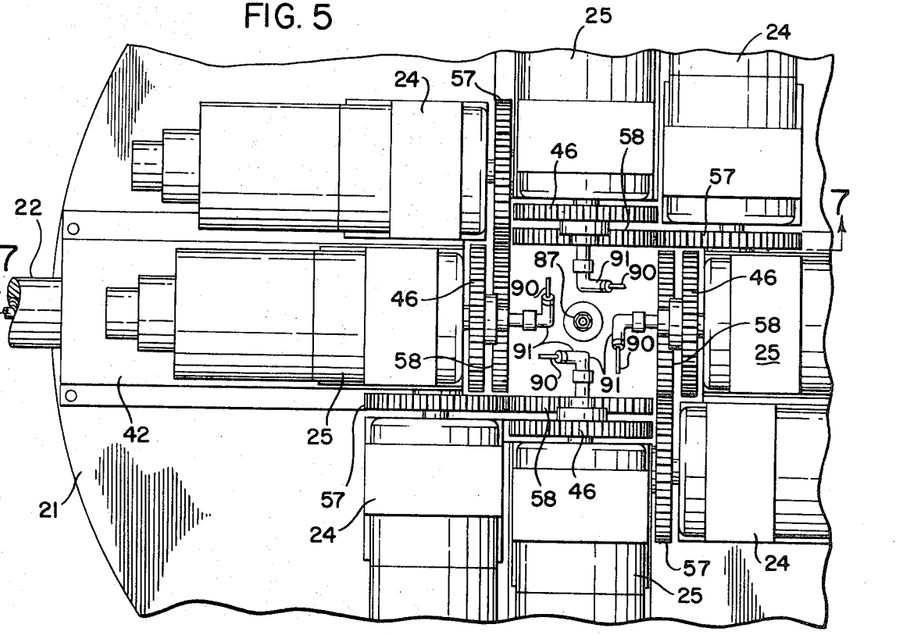
FIG. 5 is an enlarged plan view of the drive means for each mold carrying spindle illustrated in FIG. 1.

Upon rotation of the table 21, the mold assemblies 75 on the outer end of a spindle 22 enter the oven 26. To permit such entry into the oven 26, a door 120 is raised by a suitable door opening mechanism (not shown). The inner face or wall of the oven 26 is provided with a horizontal slot 121 to provide clearance for the spindle 22, the slot 121 preferably being largely closed by a depending curtain 122 that is simply deflected upwardly by the spindle as shown in FIG. 3. When the mold carrying spindle 22 positions the mold assembly 75 within the oven 26, the motor 112 is stopped by a suitable control means (not shown) for a predetermined heating period.

The oven 26 provides a heating chamber 124 which is defined by a top wall 125, an inner sidewall 126, a heat directing baffle assembly 127, a damper 128, the entrance door 120, and an exit door 123. The oven 26 further includes a fuel delivery chamber 129 which is defined by the baffle assembly 127, the damper 128, the top wall 125, sidewalls 130, and a rear wall 131. A burner nozzle 132 extends through the top wall 125 into the fuel delivery chamber 129 and may be a natural gas burner which heats air in the chamber 129. The heated air is delivered by a centrifugal fan or blower 133 into the baffle assembly 127 which forms a distribution chamber 134. The baffle assembly 127 has a multiplicity of outlet openings 135 which are preferably adjustable in size and are distributed over a vertical wall portion 136, an oblique wall section 137, and a horizontal wall portion 138 of the assembly 127, so that heated air will be distributed around the rotating molds within the heating chamber 124 for uniformly heating the molds and the plastic material contained therein. As indicated by arrows in FIG. 2, the heated air is directed so as to flow over all surfaces of the rotating molds by the distribution of the baffle openings, including the opposed surfaces of the two mold assemblies which are swept by the hot air directed axially toward the mold supporting end of the spindle 22 between the mold assemblies. The damper 128 controls the total volume of air which is admitted to the delivery chamber 129, and its distribution can be regulated by adjusting the sizes of the baffle openings.

The wall 131 of the delivery chamber 129 is provided with an electrically controlled and powered, quick opening, "panic" door 139, which may be quickly opened as a safety precaution if a mold carrying spindle 22 cannot be indexed from the heating chamber 124 at the proper time. By opening the "panic" door 139 and turning off the fuel nozzle 132, cool air will be drawn through the opening provided by the door 139 and directed around the rotating molds within the chamber 124. At the same time that the "panic" door 139 is opened by an appropriately located "panic" control button (not shown) the main oven doors 120 and 123 are also opened. This may be effected automatically by any suitable interlock system (not shown) for opening the main oven doors in response to operator actuation of the "panic" button, as well as by indexing of the table 21. Thus, whenever indexing of the table 21 is delayed by mold unloading or loading problems, for example, the machine operator, by actuating the "panic" button, may rapidly cool the oven 26 and thereby avoid charring the resin in the molds within the oven and the mold cleaning problems that would result.

When the predetermined treating time in the oven 26 has elapsed, the motor 112 is again energized to open the oven exit door 123 and index the rotating molds from the oven 26 to the oven 27 (FIG. 1) or to the cooling chamber 28 (FIGS. 12 and 13) if the process does not require a second heating operation. The oven 27 may be joined to the oven 26 by an enclosure 140 to minimize the loss of heat and chilling of the molds during their transfer from the first oven to the second oven. The oven 27 in FIG. 1 and the ovens 26 of FIGS. 12 and 13 may be identical with the oven 26 of FIG. 1 and, therefore, will not be shown or described in detail.

The doors 120 and 123 for the oven or ovens are necessarily simultaneously actuated if the machine employs as many spindles as processing stations (FIGS. 1, 12, 13), and this is most suitably done in response to indexing of the table 121 by the controls mentioned above. Otherwise a separate control for each door is required.

A temperature differential may be maintained between the ovens 26 and 27, by appropriate setting of conventional, separate, burner and damper controls (not shown) for the two ovens, as process requirements may dictate. Commonly, a higher temperature will be maintained in the first oven 26, well above the temperatures reached by the molds and their contents during the dwell of the molds in that oven. In that case, the temperature in the second oven may be held at a level to maintain or only slightly raise the temperatures of the molds and their contents above the temperatures created in the first oven. On the other hand, when the resin being molded is of a thermosetting type, for example, a first stage reaction temperature may be developed in the first oven maintained at one oven temperature, and a second stage reaction temperature may be developed in the second oven maintained at a second, higher, oven temperature. Various other heating cycle requirements are satisfied more readily and with better control by employing the dual oven arrangement of FIG. 1 than would be possible with a single, elongated oven chamber enclosing a plurality of heating stations.

After completion of the heating operation in the second oven 27 (FIG. 1), or after completion of a single-stage heating operation in a single oven 26 (FIGS. 12 and 13), the spindle 22 and its mold assemblies 75 are indexed to the cooling chamber 28 in all forms of the machine. The cooling chamber 28 (FIGS. 1 and 2) is defined by a top wall 150, an outer sidewall 151, and an inner sidewall 152. The inner sidewall 152 is provided with a horizontal opening 153 (FIG. 2) to permit the spindle 22 to move the mold assembly 75 into position within the cooling chamber. The entrance and exit (radial) sides of the cooling chamber may be open to permit the entrance and exit of the mold assembly 75 or may be provided with automatically controlled doors to prevent outward splashing of a cooling liquid or an objectionable flow of cooling steam into a room in which the machine is located.

Within the cooling chamber, the mold assemblies may be first cooled with wet steam at about 5 to 50 pounds psi gauge and at a temperature of about 225° F. or somewhat higher, depending upon the solidification temperature of the particular resin if the resin is thermoplastic. To this end, there is provided a plurality of steam nozzles 154 which are directed toward the rotating mold assembly 75. A fan 155 is provided to effect rapid air circulation over all surfaces of each mold 76, either as a separate cooling step before cooling with steam or water, or as a means for accelerating drying of the molds after a water cooling step. The steam temperature is selected to provide rapid cooling to a point only slightly below the solidification temperature of a thermoplastic resin (generally around 300° F.) or to a comparable temperature if a thermosetting resin is being molded. After the mold temperature has been initially lowered by a steam spray cooling water is sprayed through the same nozzles 154, or through separate nozzles if desired, to further cool the mold assembly to a temperature which will permit handling at the mold unloading and loading station.

After the mold assemblies have been cooled in the cooling chamber 28, the table 21 is again indexed to move the cooled molds to the next station for unloading and, optionally, also for reloading. To facilitate unloading of the molds, it is desirable to stop the spindle rotation by the time the molds arrive at the unloading station and to do this so that the molds have the desired orientation for convenient unloading and reloading. To this end, a magnetically permeable (iron) disc-shaped vane 160 (FIGS. 7 and 7A) is concentrically mounted on the outer sleeve 40 of each spindle 22 for turning within a slot 161 of a vane switch 162 mounted on the outer end of the spindle housing 42. The vane 160 is notched at 163 to provide an interruption of a magnetic flux path across the switch slot 161 through the vane 160 when the molds are in their desired loading and unloading orientation. In addition, for each spindle, two additional cams (not shown), like the cam 123, and another step switch (not shown), like the switch 122, are respectively mounted on the table 21 and pedestal 113 at suitable locations for coaction to close and open the power circuits for the drive motors 24 and 25 associated with that spindle. This step switch and the vane switch 160 are connected in parallel in the motor power circuits so that both must open to step the motors. Thus, after the step switch in the motor power circuits has been opened, the switch 162 is also opened the next time the notch 163 in the disc 160 arrives in the position shown in FIG. 7A so as to de-energize the drive motors for that spindle and stop the spindle rotation with the desired orientation of the molds. By using motors 24 and 25 having conventional dynamic braking that stopping is substantially instantaneous.

As will be appreciated from the foregoing, this invention provides effective apparatus for carrying out a number of advantageous process steps which result in more efficient production of improved molded articles. One of these process steps is the feeding of inert gas to the molds, as described above, to minimize oxidation and degradation of the resin and to reduce shrinkage and permanent distortion of the molded articles by supporting them internally during cooling.

Another of these process steps is the above-described two stage heating of the molds and their contained resin, one stage at one of the process stations and the second stage at the succeeding process station. Since each dwell of the rotating table is necessarily of the same duration in a multiple spindle machine of the character shown in FIG. 1, such two stage heating at two stations makes more efficient cycling of the machine possible since most molding operations require a longer heating time than cooling time. The output of a machine having a given number of spindles may be increased as much as 100 percent by such use of two ovens and two heating stations, while providing greater processing flexibility as pointed out above.

Still another of these process steps is the two-stage cooling of the mold and molded article therein, first with a relatively high temperature fluid, such as wet steam, to quickly and uniformly lower the temperature of the molded article only slightly below the temperature at which a thermoplastic resin is completely solidified, and then with a liquid coolant, such as water, to complete the cooling operation. Despite the relatively high temperature of the wet steam, the water droplets therein flash into vapor when they contact the hotter molds, thus rapidly extracting heat while obtaining the greater surface scrubbing action of the steam spray and more rapid and complete envelopment of the molds by the cooling fluid. The result is rapid cooling at a more uniform rate over the entire surface of each mold and less product distortion from differential cooling. Though such two-stage cooling is relatively rapid, it is not quite as rapid as when the molds are initially contacted with a water spray and, therefore, reduces the cooling shock while the product is undergoing solidification.

Shock during the initial cooling may be still further reduced merely by delaying the steam cooling step and running the fan 155 (FIG. 2) to effect initial cooling in a current of room temperature air, then stopping the fan during the successive steam and water cooling steps, and finally restarting the fan to accelerate drying of the wet molds before they are indexed to the next station for unloading and reloading. As previously mentioned, any number and sequence of the air, steam, and water cooling steps described herein may be used to adapt the cooling operation to the particular job. Also, of course, other cooling media may be substituted for steam or for water.

What is claimed is:

1. In the method of rotational molding of resinous material to form a hollow article by heating the material in a substantially closed mold while rotating the mold about a plurality of angularly related axes until the resin has taken the shape of the interior of the mold and then cooling the mold and the material therein to produce the molded article in a handleable solid condition, the improvement comprising the following combination of steps:
   a. simultaneously rotating the mold about the axis of an elongated, rotating, mold-supporting spindle and about an axis transverse thereto adjacent one end of the spindle during the heating and cooling steps while supporting the spindle at a point adjacent the opposite end thereof,
   b. maintaining a gas passageway from inside the mold to and along said spindle axis to a point adjacent said point of spindle support with one end of said passageway opening inside the mold and inside the article being molded therein and the opposite end of said passageway opening adjacent said point of spindle support for gas flow through said passageway between the inside of said article being molded and the passageway opening adjacent said point of spindle support, and
   c. at least throughout the mold cooling step, sealing said mold against flow of gas into the article being molded other than through said passageway.

2. The method improvement of claim 1 in which the passageway opening adjacent said point of spindle support is maintained open to the atmosphere during the heating of the mold.

3. The method improvement of claim 1 in which the passageway opening adjacent said point of spindle support is maintained open to the atmosphere during heating and cooling of the mold.

4. The method improvement of claim 1 in which the mold is cooled in a cooling chamber with the passageway opening adjacent said point of spindle support remaining outside of said chamber.

5. The method improvement of claim 1 in which the mold is cooled in a cooling chamber with the passageway opening adjacent said point of spindle support remaining outside of said chamber, the cooling being effected first by enveloping the mold with wet steam directed toward the mold from a plurality of directions and then by directing sprays of a liquid coolant against the mold.

6. The method improvement of claim 1 in which the mold is cooled in a cooling chamber while maintaining a substantially constant positive gas pressure in said passageway.

7. The method improvement of claim 1 in which said spindle is moved to position the mold in a heating chamber and again to position the mold in a cooling chamber with the passageway opening adjacent said point of spindle support remaining outside of said chambers.

8. The method improvement of claim 1 in which said spindle is moved to position the mold in a heating chamber and again to position the mold in a cooling chamber with the passageway opening adjacent said point of spindle support remaining outside of said chambers, the method including the step of maintaining a substantially constant positive pressure of gas in said passageway during both heating and cooling.

9. The method improvement of claim 9 in which said gas is inert to the material being molded at the highest temperature of said material produced by heating the mold.

10. The method improvement of claim 9 in which said gas is inert to the material being molded at the highest temperature of said material produced by heating the mold, the mold having a parting plane between mold sections, and said sections being joined to permit gas leakage at said parting plane until blocked by distribution of said material over the interior mold surface during heating and mold rotation.

11. In the method of rotational molding of resinous material to form a hollow article by heating the material in a substantially closed mold while rotating the mold about a plurality of angularly related axes until the resin has taken the shape of the interior of the mold and then cooling the mold and the material therein to produce the molded article in a handleable solid condition, the improvement comprising the following combination of steps: 9
   a. repeatedly moving a series of four molds along a continuous closed path in a stepwise manner from one to the next of four stations along said path with a constant dwell of all molds at all stations, the four molds and the four stations being equally spaced along said path with a mold at each station during each dwell; and
   b. charging each mold at a first station and heating each mold at the second station, followed by cooling each mold at the fourth station, and finally unloading and recharging each mold at the first station, the third station being devoted to a continuation of the heating step begun at the second station, the heating of the molds at the second station being effected by subjecting the molds to a high temperature atmosphere to bring them to a temperature substantially below said high temperature during the dwells of the molds, and the heating at the third station being effected by subjecting the molds to an atmosphere at a final temperature also substantially below said high temperature to bring the molds to said final temperature during the dwells of the molds.

* * * * *

UNITED STATES PATENT OFFICE
CERTIFICATE OF CORRECTION

Patent No. 3,683,062      Dated August 8, 1972

Inventor(s) Elmer J. von der Heide

It is certified that error appears in the above-identified patent and that said Letters Patent are hereby corrected as shown below:

In the first column of the page containing the Abstract of the patent, lines 6 and 7 should be changed from:

"[73] Assignee: Essex International, Inc., Fort Wayne, Ind."
to
--[73] Assignee: Fabricators, Inc., Ravenna, Ohio--.

In the Abstract, line 9, after "pair of" insert --molds on the outer end thereof for simultaneous rotation about a pair of--.

Column 1, line 42, "stops" should be --steps--.

Column 5, line 12, "a" should be --at--;

line 27, "stops" should be --steps--;

line 38, "120°" should be --120° apart.--; and line 38, cancel "AS" (second occurrence).

Column 6, line 18, after "30d," insert --and--.

Column 14, line 16, change "9" to --8--;

line 20, change "9" to --8--; and line 36, cancel "9".

Signed and sealed this 10th day of April 1973

(SEAL)
Attest:

EDWARD M. FLETCHER, JR.
Attesting Officer

ROBERT GOTTSCHALK
Commissioner of Patents